UNITED STATES PATENT OFFICE.

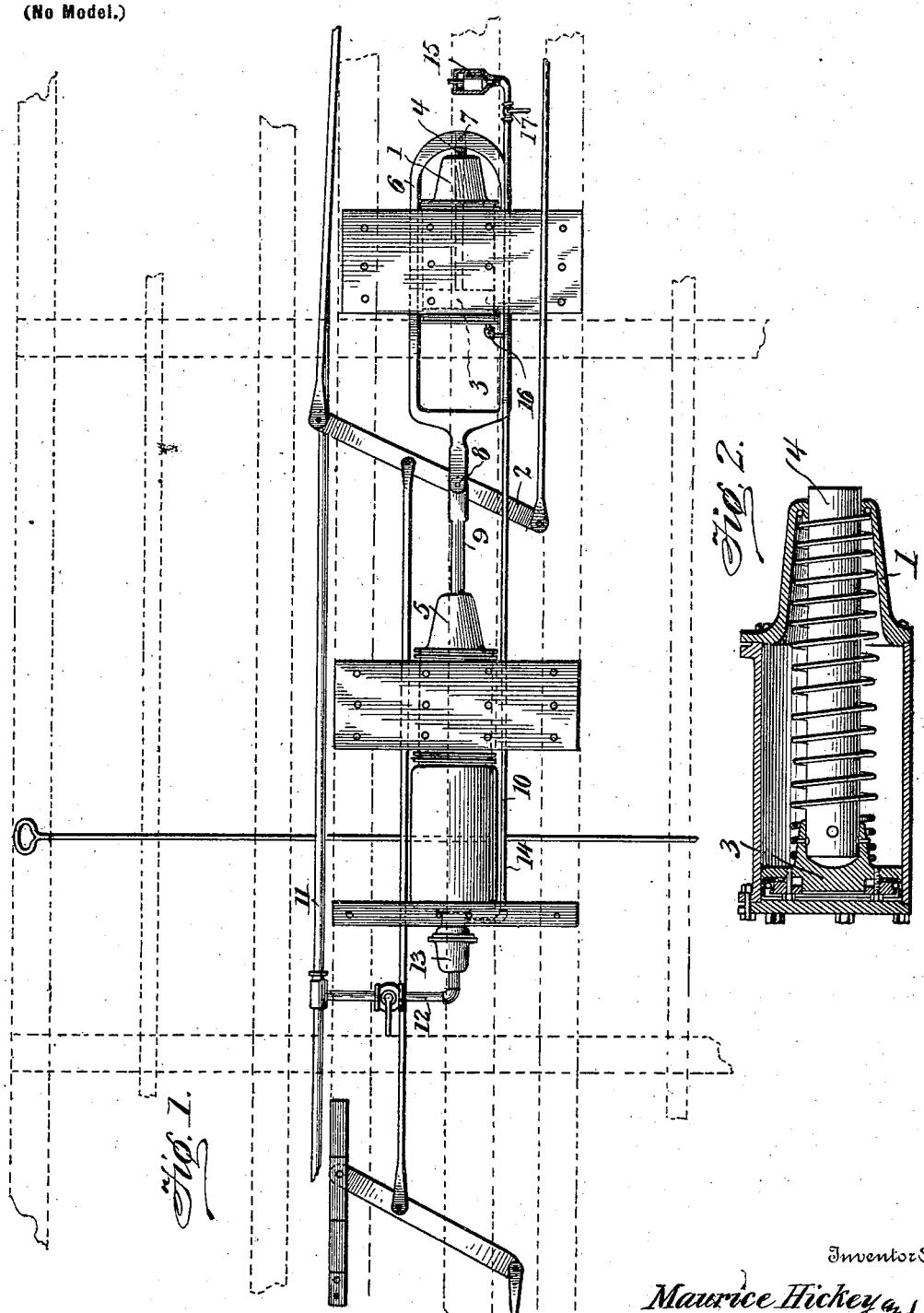

MAURICE HICKEY AND FORTUNATUS G. KELLOGG, OF TACOMA, WASHINGTON.

AIR-BRAKE.

SPECIFICATION forming part of Letters Patent No. 680,456, dated August 13, 1901.

Application filed February 2, 1901. Serial No. 45,754. (No model.)

*To all whom it may concern:*

Be it known that we, MAURICE HICKEY and FORTUNATUS G. KELLOGG, citizens of the United States, residing at Tacoma, in the county of Pierce and State of Washington, have invented certain new and useful Improvements in Air-Brakes; and we do hereby declare the following to be a full, clear, and exact description of the invention, such as will enable others skilled in the art to which it appertains to make and use the same.

Our invention relates to improvements in braking mechanism for cars or like vehicles; and it consists in apparatus by which the exhaust from ordinary braking-cylinders in common use may be employed for applying the brakes and holding cars or trains upon long downgrades, especially when the trains are heavily loaded, said apparatus preferably comprising an auxiliary cylinder connected with the lever operated by the main braking-cylinder, the said cylinder being adapted to receive the exhaust from the said main braking-cylinder.

It further consists in certain other novel constructions, combinations, and arrangements of parts, as will be hereinafter fully described and claimed.

In the accompanying drawings, forming a part of this specification, Figure 1 represents an inverted plan view of a portion of a car, showing a part of a braking apparatus applied thereto. Fig. 2 is a longitudinal central section through our improved auxiliary braking-cylinder.

In braking systems in common use it has been quite common heretofore to conduct the exhaust from the usual braking-cylinder of the apparatus through what is known as a "retainer-pipe" to a suitable point upon a car where the exhaust is discharged, the retainer-pipe being provided at this point with a retainer cock or valve to regulate the pressure required for the discharge of the said exhaust. The pressure held in the retainer-pipe is usually sufficient to supply the brakes while the amount of pressure in the train-pipe and the auxiliary reservoir of the braking system is being made up. In conducting heavy trains or heavily-loaded trains down steep inclines, or especially down long grades, we find that it is desirable to employ a more effective means for holding the brakes while the pressure in the auxiliary reservoirs is being increased or is being brought to its original standard. We contemplate, therefore, employing an auxiliary cylinder such as that shown at 1 in the drawings, which may be of any suitable construction and is preferably made like those in common use, the said cylinder being so arranged that its piston may be connected with the main braking-lever 2 of the braking system. The piston 3 of the cylinder 1 may have its piston-rod 4 connected with the lever 2 in any suitable way, and a convenient method of arranging the parts is illustrated in Fig. 1 of the drawings, in which the auxiliary cylinder 1 is arranged upon the opposite side of the lever 2 from the main braking-cylinder 5.

In order that the piston 3 of the auxiliary cylinder 1 may exert a pressure upon the lever 2 in the same direction in which the piston of the main braking-cylinder 5 exerts its pressure, we provide a yoke, as 6, made with an elongated opening sufficient to permit of the necessary motion of the parts, the said yoke extending around the auxiliary cylinder 1 and being connected at 7 with the outer end of the piston-rod 4. The other end of the yoke is pivotally connected, as at 8, with the lever 2. The same pivot-pin which connects the piston-rod 9 of the cylinder 5 with the said lever may be employed for connecting the yoke 6 with the said lever. By this arrangement the power applied in the cylinder 1 will add its force to the power applied in cylinder 5. The cylinder 5 is connected with the usual auxiliary reservoir 10, which receives pressure from the train-pipe 11 through branch piping 12, the introduction and exhaust of said pressure being controlled in the usual manner by a suitable triple cock, as at 13. The exhaust from the cylinder 5 is preferably conducted into the ordinary retainer-pipe 14 and may thus be lead to any point upon the car, the end of the said pipe being preferably provided with a retainer cock or valve, as 15, of suitable construction, a controlling cock or valve 17 being arranged in the retainer-pipe near the cock 15, by which the pressure in said pipe may be entirely retained or entirely exhausted or partially retained by causing the exhaust to pass through the retainer-valve 15.

In order to utilize the exhaust in the cylinder 1, we connect the retainer-pipe by means of a branch pipe 16 with the said cylinder 1, as clearly illustrated in Fig. 1 of the drawings. In using this apparatus we adjust the retainer cock or valve so that a greater pressure than usual will be necessary to force the exhaust through the same upon heavy grades. A heavier pressure than commonly used will thus be held in the retainer-pipe and will be conducted into the auxiliary cylinder whenever the main cylinder is exhausted. By this simple mechanism we are enabled to employ the exhausted air from the principal cylinder 5 in an auxiliary cylinder, as 1, so that the brakes may be held with a suitable pressure while the pressure in the auxiliary reservoirs is being made up or increased. The auxiliary cylinder may thus be made to assist the main cylinder in applying the brakes, and the parts may be so regulated that on a long downgrade the brakes may be applied with considerable power while the pressure in the auxiliary reservoirs is being increased. When running upon moderate grades, the retainer valve or cock will be adjusted as usual, so that the exhaust will discharge in the usual and ordinary manner, the auxiliary cylinder not being necessary on such light grades.

It will be apparent from the above description that by a simple apparatus we are enabled to use the exhaust from the braking-cylinders of an ordinary braking system with greater effect than has been heretofore done and that almost any desired pressure may be used to hold a train in check while pressure exhausted from the auxiliary reservoirs is being renewed.

While we have shown our invention as applied to the Westinghouse system of brakes, we do not wish to be understood as confining the invention to such application, as it will be evident that it may be applied to any system of braking in common use.

Having now described our invention, what is claimed as new, and desired to be secured by Letters Patent, is—

1. In a braking apparatus, the combination with a braking-cylinder, train-pipe connections and an exhaust-pipe, of an auxiliary cylinder adapted to assist the main cylinder, and means connecting the exhaust-pipe of the main cylinder with the said auxiliary cylinder, whereby the exhaust will be utilized in the auxiliary cylinder for further holding the brakes, substantially as described.

2. In a braking system, the combination with a braking-cylinder and an exhaust-pipe, of an auxiliary cylinder connected with the braking mechanism so as to assist the main cylinder, and means for conducting the exhaust into said auxiliary cylinder for operating the same, substantially as described.

3. In a braking system, the combination of a braking-cylinder, a train-pipe for supplying pressure to the same, a triple valve for controlling the admission of pressure to the cylinder and the exhaust therefrom, a retainer-pipe leading from said cylinder, an auxiliary cylinder adapted to assist the main cylinder, a branch pipe connecting the retainer-pipe to the auxiliary cylinder, so that when the pressure in the main cylinder is exhausted the pressure of the exhaust will be applied in the auxiliary cylinder and means for maintaining a suitable pressure in the retainer-pipe, substantially as described.

4. Means for utilizing the exhaust from an ordinary braking system, comprising an auxiliary cylinder, means connecting the auxiliary cylinder with the main cylinder of the system, and means for conducting the exhaust from the main cylinder into said auxiliary cylinder for holding the brakes while the pressure is being renewed in the braking system, substantially as described.

5. A mechanism for utilizing the exhaust of ordinary braking systems, comprising an auxiliary cylinder, means connecting the piston of said cylinder with the main braking-lever, a branch pipe connected with the retainer-pipe of said system for introducing the exhaust into the said auxiliary cylinder, and means for holding a suitable pressure in the retaining-pipe, substantially as described.

6. In a braking system, the combination with a main cylinder, and train-pipe connections, of a retainer-pipe adapted to conduct the exhaust therefrom, an auxiliary cylinder arranged in tandem with the main cylinder, a yoke surrounding the auxiliary cylinder and connecting its piston-rod with the braking-lever of the braking apparatus, a branch pipe connecting the retainer-valve for holding a suitable pressure in said pipe, the structure being such that when the pressure in the main cylinder of the apparatus is exhausted its force will be applied in the auxiliary cylinder to assist in maintaining a suitable pressure upon the brakes, while the pressure in the auxiliary reservoirs is being renewed or increased, substantially as described.

In testimony whereof we hereunto affix our signatures in presence of two witnesses.

MAURICE HICKEY.
FORTUNATUS G. KELLOGG.

Witnesses:
CHARLES A. MURRAY,
FRANK J. MILLER.